June 4, 1929.  H. HUEBER  1,716,135
AUTOMATIC WINDSHIELD CLEANER
Filed Oct. 14, 1925   5 Sheets-Sheet 2

June 4, 1929.   H. HUEBER   1,716,135
AUTOMATIC WINDSHIELD CLEANER
Filed Oct. 14, 1925   5 Sheets-Sheet 4

Inventor
Henry Hueber
Barton A. Bean Jr.
Atty.

June 4, 1929.  H. HUEBER  1,716,135
AUTOMATIC WINDSHIELD CLEANER
Filed Oct. 14, 1925   5 Sheets-Sheet 5

Inventor
Henry Hueber
By Barton A. Bean
Atty.

Patented June 4, 1929.

1,716,135

UNITED STATES PATENT OFFICE.

HENRY HUEBER, OF BUFFALO, NEW YORK, ASSIGNOR TO TRICO PRODUCTS CORPORATION, OF BUFFALO, NEW YORK.

AUTOMATIC WINDSHIELD CLEANER.

Application filed October 14, 1925. Serial No. 62,436.

This invention relates to automatic or power operated windshield wipers or cleaners.

The objects of the present invention are to provide a windshield cleaner which will effectively clean a relatively large area of the windshield glass and in which the wiper member or strips may be readily moved automatically to non-vision-obstructing positions; also to provide an automatic windshield cleaner which will effectively clean a relatively large area of a windshield glass and in which the cleaning effort may be directed to a particular portion of this area; also to provide an automatic windshield cleaner utilizing more than one wiper strip, in which the wiper strips may be selectively used to clean different portions of the windshield glass or operated together to work upon the same portion of the windshield glass simultaneously.

According to the invention the windshield wiper is provided with one or more wiper members or wiper strips, preferably a pair, adapted to contact with and clean the windshield glass, together with means for moving these members upon portions of the windshield glass, and means for causing said wiper members to assume a non-vision-obstructing position at the conclusion of the windshield glass cleaning operation.

In the embodiment of the invention shown, there is illustrated a windshield cleaner of the general form shown in copending application, Serial No. 62,435. The cylinder or moving part of the cleaner and the housing, if a housing is provided, may be of any suitable form. In the form illustrated, 10 designates the housing having air inlet and exhaust pipes 11 and 12 mounted therein, on which pipes the cylinder 13 slides or moves. These pipes communicate interiorly of the cylinder with a fixed piston or abutment 14 provided with ports 15 and 16 communicating respectively with the air inlet and air exhaust pipes and with the inlet chamber 17 and exhaust passage 18. A port or passage 19 establishes communication between chamber 17 and the ends of the cylinder and a valve 20 controls port 19 and the placing of the ends of the cylinder in communication with the air inlet. A pair of ball valves 21 and 22 control passage 18 and communication between this passage 18 and the ends of the cylinder.

In use of these devices upon automobiles, the air exhaust tube is connected to a line or conduit in communication with a suction passage such as the intake manifold of the vehicle engine and the valves automatically reverse in order that the cylinder may move back and forth on the pipes in the housing.

The passage 19 is provided with valve seats 23 and 24 adapted to cooperate with ball valve 20. The chamber or passage 18 is provided with valve seats 25 and 26 controlled by ball valves 21 and 22 respectively. The piston is preferably provided with cupped leather packings as indicated at 27 and 28 for the purpose of preventing leakage of operating fluid past the piston.

Figure 1:
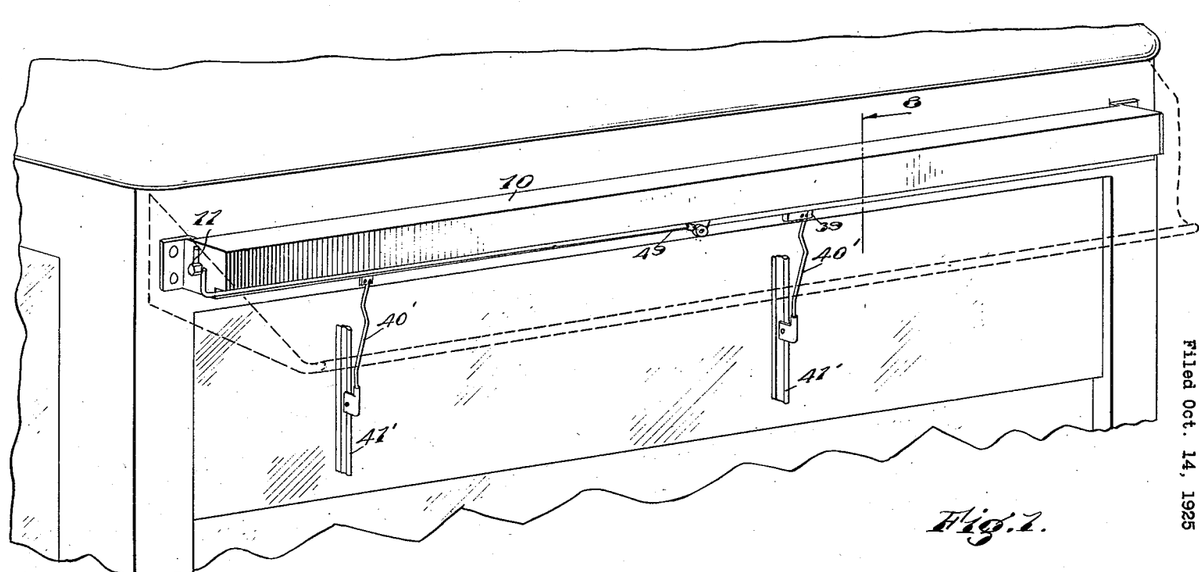
Fig. 1 is a perspective view of a portion of the front of an automobile equipped with a windshield cleaner according to the invention.
Figure 2:
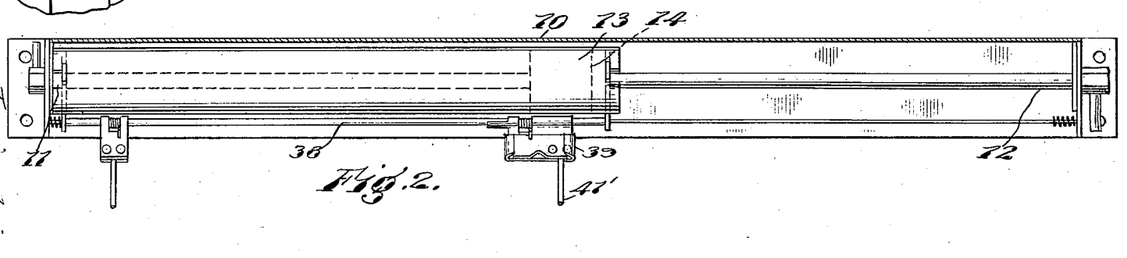
Fig. 2 is a rear sectional elevation of a windshield cleaner embodying the invention.
Figure 3:
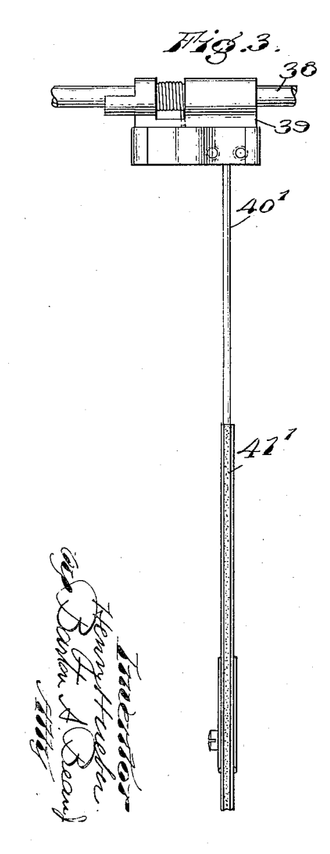
Fig. 3 is a rear elevation of one of the wipers and wiper carrier.
Figure 4:
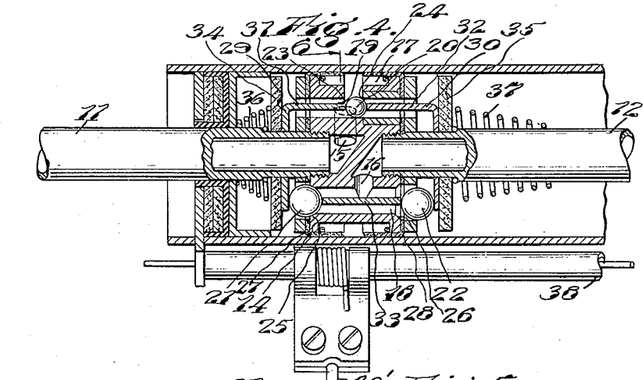
Fig. 4 is a section through the cylinder and piston of the windshield wiper, on an enlarged scale.
Figure 5:
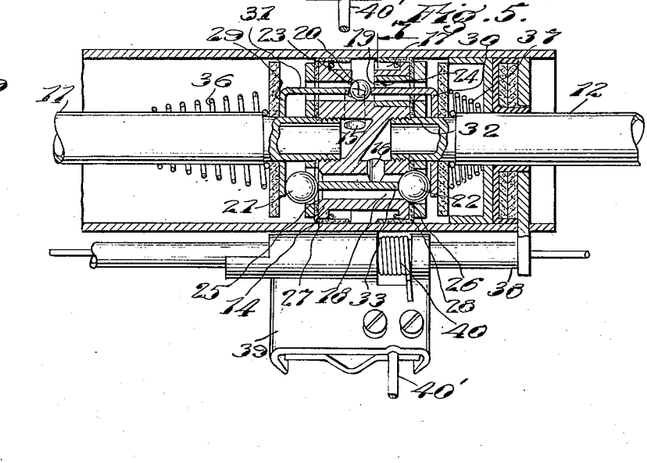
Fig. 5 is a view similar to Fig. 4, but with the valves in different positions.
Figure 6:
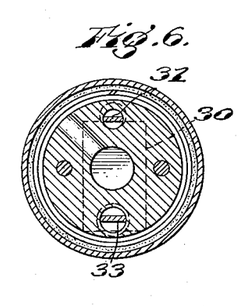
Fig. 6 is a section about on line —6—, Fig. 4.
Figure 7:
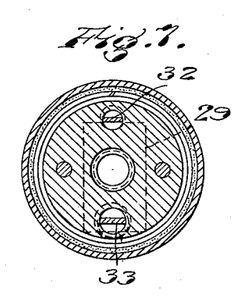
Fig. 7 is a section about on line —7—, Fig. 5.
Figure 8:
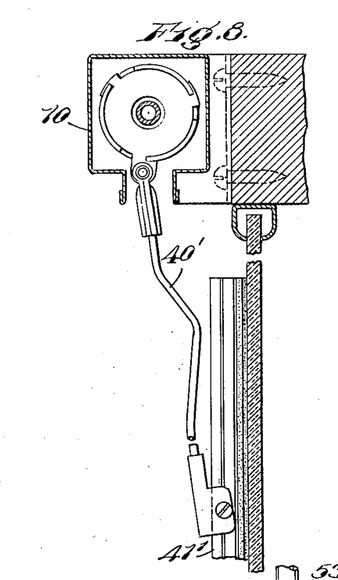
Fig. 8 is a section about on line —8—, Fig. 1, on an enlarged scale.

The piston thus generally described and the valves may be of any suitable construction, the form shown being that described in detail and claimed in concurrently filed application, Serial No. 62,437. As illustrated in Fig. 4, the ball valve 20 is in contact with valve seat 24, thereby closing communication between the chamber 17 which receives atmospheric air and the right hand side of the cylinder, the atmospheric air being applied past the valve seat 23 which is open to the left hand side of the cylinder. In the illustration in Fig. 5, the ball valve 20 is in contact with the seat 23, thereby putting the right hand side of the cylinder in communication with the atmosphere and closing the left hand side of the cylinder to the atmosphere. The exhausting of air from the sides of the cylinder is controlled by the ball valves 21 and 22 which cooperate with the seats 25 and 26 of passage 18. In the illustration in Fig. 4, the ball 21 is on its seat 25, thereby closing the left hand side of the cylinder to the air exhausting influence and the air is being exhausted from the right hand side of the cylinder past the ball valve which is off of its seat. The reverse is the situation with regard to Fig. 5 where the valve 21 is off of its seat. Consequently air is being exhausted from the left hand side of the cylinder through means of pipe 12, port 16 and passage 18. In the form shown, the valves are actuated by the following means:

29 and 30 designate a pair of plate members which are mounted for limited movement on the pipes 11 and 12. These plate members have body portions and angular tongue or arm portions 31 and 32. The body portions are disposed approximately parallel to the sides of the piston and the tongues or arms 31 and 32 extend into the passage 19 and the ends of these tongues or arms contact with the ball valve 20 at opposite sides thereof. The ends of the plate or body members remote from the arms or tongues are adapted to contact with the ball valves 21 and 22 and cause movement of these ball valves by pressing against one or another of the valves, the one valve being moved by the other through the intermediary of a spacing member 33. This spacing member 33 is preferably of such size so as to lie loosely and move freely in the passage 18, whereupon movement of one of the ball valves towards its seat will cause the other ball valve to be removed from its seat. 34 and 35 designate washers or buffing strips of felt or other suitable material which are interposed between the body portions of the plate members and the springs 36 and 37 respectively, through which pressure is transmitted from the ends of the cylinders to the valves to move them. As illustrated in Fig. 4, the left end of the cylinder is pressing upon the spring 36. This has compressed the spring 36, moving the plate 29, thereby seating the valve 21 and removing the valve 22 from its seat. At the same time the valve 20 is forced to its seat 24 and in such position air exhausting influence is ready to be applied to the right hand of the cylinder and atmospheric air is admitted from the chamber 17 through the passage 19 past the valve seat 23 into the left hand side of the cylinder. This results in a movement of the cylinder towards the left from the position shown in Fig. 4 until, as shown in Fig. 5, the right hand end of the cylinder contacts with the spring 37, which exerts its pressure upon the plate 30, resulting in seating the valve 22, in unseating the valve 21 and in placing the atmospheric ball valve 20 upon its seat 23. In such position the air exhausting influence is applied through the port 16, passage 18, past valve seat 25, to the left hand end of the cylinder and atmospheric air is being admitted from chamber 17, past valve seat 24 to the right hand end of the cylinder. These operations continue intermittently as long as the conduit 12 is under the air exhausting influence, moving the cylinder back and forth upon the tubes 11 and 12 and moving the wiper strips back and forth upon the windshield glass.

In the embodiment of the invention shown, the wiper members are carried on a guide tube or member 38 mounted on the cylinder. The wiper members are preferably slidably connected to the guide tube and comprise suitable carriages or clamp members, which are slidable on the guide tube, and the elements 40' and 41'. In the form shown, 39 designates one of the carriages for one of the wiper members. This carriage may be of suitable form being slidably mounted upon the guide tube and preferably provided with a spring 40 surrounding the guide tube, one end of the spring bearing upon the cylinder and the other end bearing upon the carriage 39, whereby the carriage is resiliently urged toward the windshield glass. The carriage is provided with a suitable wiper supporting member, as for example, the rod 40' which carries the wiper strip 41'. This may be formed with or attached to the carriage in any suitable manner. In the form shown, the rod member is clamped by screws in a suitable recess in the carriage. The carriage members are preferably of such form and the wiper supporting rods so mounted that pressures or forces exerted at the wiper ends of the wiper supporting rods will be transmitted transversely of the guide tube so as to prevent relative movement between the carriages or the wiper strips and the guide tube from pressures or friction exerted upon the wiper when the device is in operation. At the same time this permits of the application of a force or pressure on the carriages in a direction lengthwise and substantially parallel to the guide tube to move the wiper carriage along and relatively to the guide tube independently of the carriages. In other words, the carriages are independently and slidably adjustable on the guide tube 38 but unless positively restrained or arrested they move as a unit with said tube by reason of the fact that the resistance offered the wiper acts to bind the carriage on the tube sufficiently to connect the carriage thereto. Also, the spring 40 of each carriage provides additional friction sufficient to prevent the carriage sliding on the tube when the same is moved along with the cylinder. Obviously then the spring 40 serves as a frictional connecting means between the wiper members 39, 40' and 41' and the tube 38, and the friction incident to the sliding of the carriage on the guide tube is greater than the friction of the wiper on the windshield glass. The guide tube constitutes an elongated, bar-like support for the wiper members. Other forms of engaging or interengaging mounting may be provided if desired. In the normal operation of the device, the carriages and their depending wiper members are spaced apart on the cylinder and are moved in spaced relation on the windshield glass, the wiper carriages being frictionally held in spaced relation as aforesaid. If, as illustrated in the drawing, the device is mounted to clean the entire width of the windshield glass, one wiper will clean substantially one half of the windshield glass to the right, and the other wiper will clean substantially the other half of the windshield glass panel to the left.

Figures 17, 18, 19:
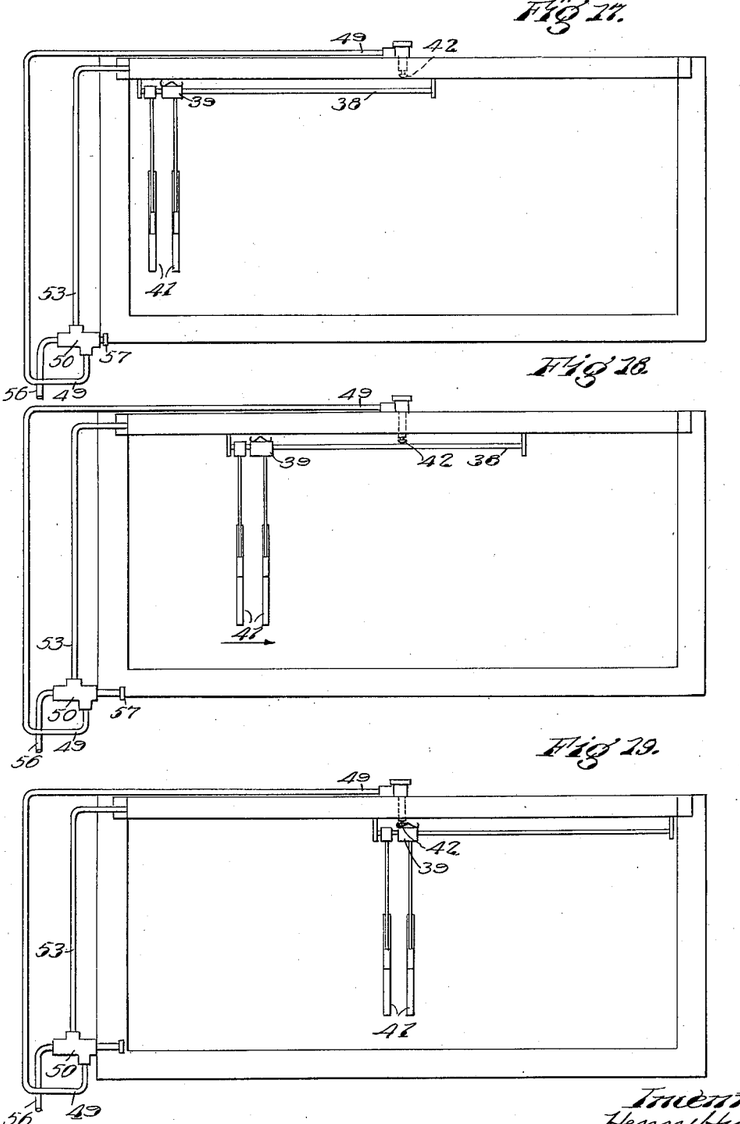
Figs. 17, 18, 19, 20, 21 and 22 are diagrams illustrating the movements of the window wipers in use of the device of this invention.
Figure 20:
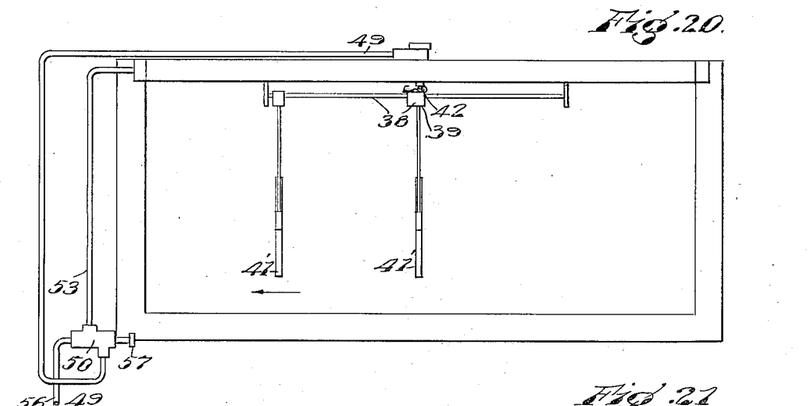

In order that the wipers may be placed in non-vision obstructing positions, means are preferably provided for causing all of the wipers to be moved to a given position, as, for example, to the position illustrated diagrammatically in Fig. 17, where the wipers are adjacent the right hand side of vehicle. (The left hand side of the figure). It will thus be seen that they are entirely out of line of vision of the driver, who is located to the left of the car. In the embodiment shown, this is accomplished by changing the position of one of the wipers and its carriage with respect to its guiding rod so that this wiper will be positioned immediately adjacent the other wiper and will move with that wiper to the extreme limit of the stroke of the device, where it may be readily stopped. This is accomplished by suitable means for releasing the frictional connection between the wiping member, the guiding rod and the one wiper carriage. For this purpose a movable detent member is provided which engages a part on the wiper carriage and arrests its motion while permitting the cylinder and the guide rod to move until the other wiper carriage has approached and come to a position substantially in contact with the arrested wiper carriage, whereupon the detent may be released and the two wipers and the two carriages will travel together in adjacency. As indicated in Figs. 17, 18 and 19 they may be caused to travel back and forth in such positions to exert wiping action upon the desired portion of the windshield glass which may be hard to clean or require extra wiping effort and then, as indicated in Fig. 17, by stopping the operation of the instrument they will be parked or placed in the non-vision-obstructing position, as aforesaid.

In the preferred embodiment illustrated the detent is operated by fluid pressure, the detent 41 having a head 42 (Figs. 11 and 12) adapted to engage the wiper carriage, being housed in a suitable casing 43 having a body or pressure applying portion 44 adapted to be acted upon by the atmosphere to force the detent out of its casing to a motion arresting position. The head of the detent engages a catch member or lug 45 on the wiper carriage (Figs. 11 and 12) and is normally held in retracted or inoperative position by a spring 46, Fig. 12. In order to permit the atmosphere to act to force the detent out, the casing is provided with an atmospheric port or opening 47 and a chamber 48 and the other side of the body portion 44 of the detent is in communication with a port in communication with a line 49 which is adapted to be placed in communication with the suction influence, so that air will be removed from the one side of the pressure applying portion of the detent and atmosphere acting upon the other side will force the detent out of its casing into the position shown in Figs. 11 and 12 where it will engage the flange or lug 45 on the wiper carriage and arrest motion of that wiper carriage and its wiper, while permitting the cylinder and the other wiper to continue reciprocating.

Figures 9, 10, 11, 12, 13:
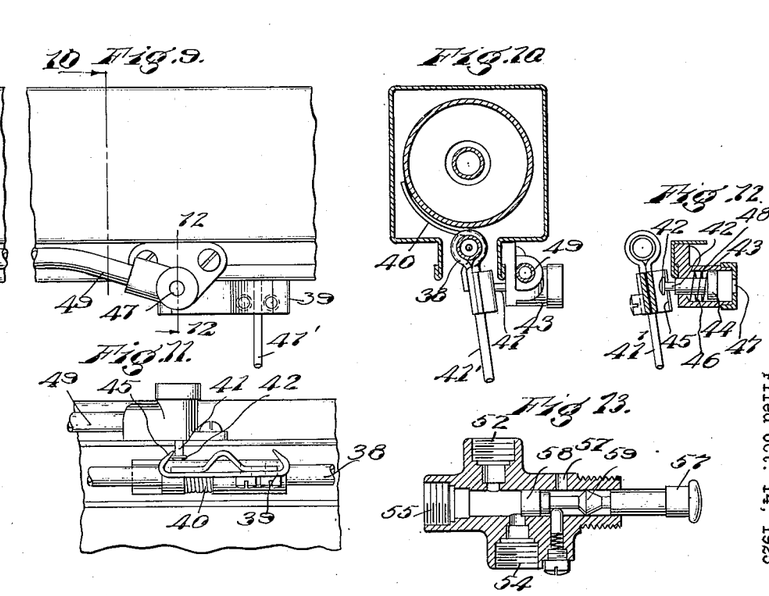
Fig. 9 is a rear elevation of a portion of the device showing the wiper detent.
Fig. 10 is a section about on line —10—, Fig. 9.
Fig. 11 is a bottom plan view of the portion of the cleaner shown in Fig. 9.
Fig. 12 is a section on line 12—12, Fig. 9.
Fig. 13 is a sectional elevation of the control valve for controlling and regulating operation of the cleaner.
Figure 14:
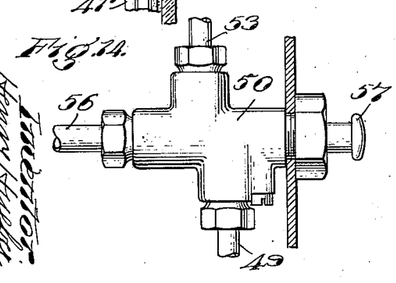
Fig. 14 is a side elevation of the control valve.
Figure 15:
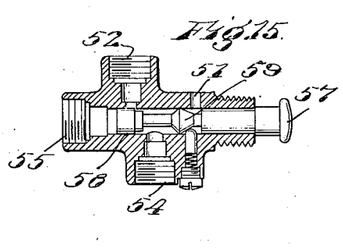
Figs. 15 and 16 are views similar to Fig. 13 but showing the control valves in different operating positions.
Figure 16:
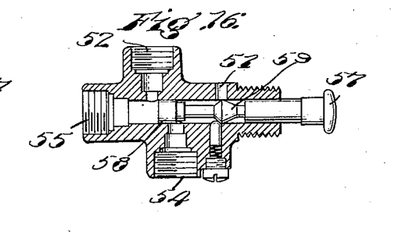
Figure 21:
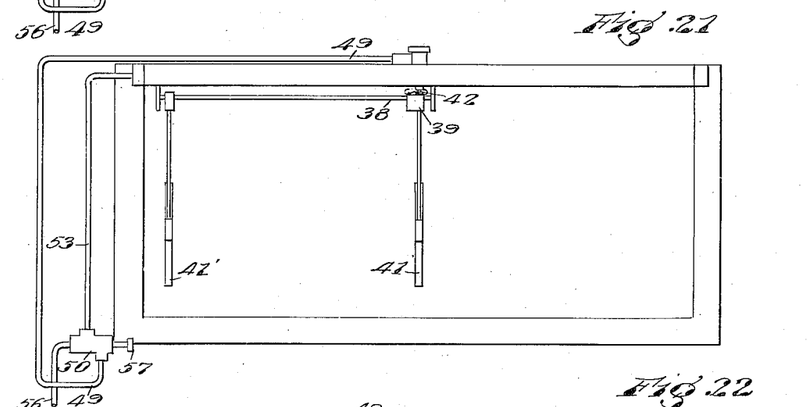
Figure 22:
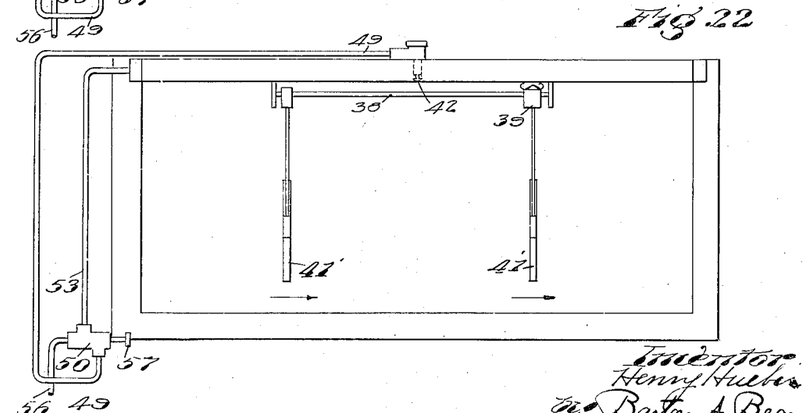

A suitable valve is provided for controlling the operation of the cleaner motor and of the cleaner positioning means or detent. This valve is preferably a combined shut-off, operating and wiper positioning or parking valve. This valve 50 which is adapted to be mounted on the dash board of the automobile or other suitable or convenient place, is preferably provided with means for subjecting the air exhaust tube of the cleaner to an air exhausting or withdrawing influence and subjecting the detent member to an air exhausting or suction influence when desired and for admitting atmospheric air to said detent member to permit it to return to its normal position, when desired. It may be of any suitable form. In the embodiment shown, these features are all combined in one valve, the valve body having a port 51 which is open to the atmosphere, a port 52 for connection as by means of a tube 53 to the air exhaust tube of the windshield wiper motor, a port 54 in communication with the tube 49 which leads from the valve to the suction chamber 48 of the detent member and a port 55 adapted to be connected as by a conduit 56 to a suitable source or air exhausting influence as, for example, the intake manifold of the automobile engine. In the embodiment of the invention shown, the valve plug is provided with a suitable handle 57 and has a body slidable in a substantially centrally disposed passage in the valve shell. The valve is provided with a head 58 and a second head 59 spaced from the first head. As illustrated in Fig. 15, in the position of the valve shown therein communication is closed between the suction influence or intake manifold and the windshield cleaner motor by the head 58 of the valve. A slight withdrawal of the valve body or plunger results in communication being opened between the suction source and the windshield cleaner motor through port 55, port 52 and pipe 53, as illustrated in Fig. 16, whereupon the windshield cleaner will go into operation, the cylinder moving back and forth carrying the wipers across the windshield glass. As illustrated in Fig. 13, a slight further withdrawal of the valve plunger opens communication between the detent and the suction source, through port 54 and pipe 49, communication between the exhaust conduit of the windshield cleaner and the suction source being open at the same time. This results in the exhausting of the air from the detent chamber 48 with the result that atmospheric air operating through port 47 on portion 44 of the detent forces the detent outwardly so that its head 42 engages flange or lug 45 on one of the wiper carriages, as illustrated in Figs. 11 and 12. This causes that wiper to be held stationary while the wiper carrying cylinder continues to move from the position shown in Fig. 21 to the position shown in Fig. 19. If, when the wipers are in the position shown in Fig. 19 the valve plunger is pushed in slightly to approximately the position shown in Fig. 16, communication between the detent chamber and the suction source is interrupted and atmospheric air enters the port 51 of the operating valve and thence passes through port 54 into the conduit 49 to the detent chamber, whereupon the spring in the detent chamber returns the detent to its normal or inoperative position. This releases the wiper which was held stationary and it will then move with the other wiper to the position shown in Figs. 18 and 17. If when the wiper has reached the position shown in Fig. 17, the valve plunger is pushed in the remainder of its effective distance to the position indicated in Fig. 15, the motion of the cleaner will be stopped and the wipers will be parked at the right hand side of the windshield, looking forward of the vehicle, out of the line of vision of the driver.

I claim as my invention:

1. In a windshield cleaner, a movable window wiper operating part, a plurality of wipers carried by said operating part and normally spaced from one another to move upon different portions of the same face of the windshield glass, and means for effecting a variation in the spacing of said wipers by and during movement of said operating part.

2. In a windshield cleaner, a movable wiper operating part, a plurality of wipers carried by said operating part and normally spaced apart from one another to be moved by said part upon the same face of the windshield glass, one of said wipers being slidably adjustable on said operating part toward and from the companion wiper, and means for arresting the motion of said adjustable wiper during movement of said operating part and in predetermined position on the windshield glass while permitting the other of said wipers to move upon the glass with said operating part.

3. In a windshield cleaner, a movable wiper operating member, a plurality of spaced wipers operably connected to said member to be moved thereby on the windshield glass, said operating member moving said wipers on the same face of said windshield glass in adjustably spaced positions, and means for automatically causing said wipers to assume contiguous positions by and during the movement of said operating member, whereby all of said wipers may be moved in adjacency to non-vision-obstructing positions on the windshield glass.

4. In a windshield cleaner, a plurality of adjustably spaced wipers adapted to contact with the same face of the windshield glass to clean the same, fluid pressure operated means for moving said wipers intermittently first in one direction and then in the opposite direction on the windshield glass, and a manually controlled fluid pressure device for bringing said spaced wipers together in substantial contact, by and during movement of said fluid pressure operated means, whereby all of said wipers may operate on a desired portion of the windshield glass.

5. In a windshield cleaner, a reciprocatory wiped moving member having an elongated wiper-supporting part, a plurality of spaced wipers connected to the part of said moving member to move therewith, means for one of said wipers being adjustable toward and from the companion wiper, and predeterminedly holding said adjustable wiper from movement with said moving member while the moving member is moving said companion wiper, to cause selective variation in the spacing between said wipers.

6. In a windshield cleaner, a movable operating member, a cleaner element connected to said operating member so as to move with said operating member or permit said operating member to move relatively to said cleaner element upon obstructing said element, and a control member for said cleaner element having a part for engaging a portion of said cleaner element to arrest motion of said cleaner element and permit said operating member to move relatively to said cleaner element.

7. In a windshield cleaner, a wiper element adapted to contact with the windshield glass, a guided, reciprocatory operating member movable relatively to the windshield glass, a carriage on said wiper element in slidable engagement with said operating member, but normally movable therewith, a stop member for arresting movement of said carriage and wiper element while permitting said operating member to move, and a part on said carriage adapted to be engaged by said stop member for effecting said arrest of movement.

8. In a windshield cleaner, a fluid pressure operated wiper operating member, a wiper member movable by said operating member on a windshield glass and adjustable on said operating member, fluid pressure operated means for effecting adjustment of said wiper with respect to said operating member, and means for connecting said wiper operating member and said first means to a source of operating fluid pressure.

9. In a windshield cleaner, a movable fluid pressure actuated wiper moving member, a wiper adjustably connected to said moving member so as to move with said moving member and whereby said moving member may move relatively thereto for effecting adjustment of the wiper, a control member for said wiper having a part adapted to engage said wiper to arrest motion of said wiper whereby said moving member may move relatively to said wiper, and a common control for said moving member and said control member 10. In a windshield cleaner, a fluid pressure operated wiper moving member, a wiper member slidably supported on said wiper moving member, means normally connecting said wiper member to said moving member so that said wiper member and said moving member move together, a detent member adjacent said wiper member, a part on said wiper member adapted to be engaged by said detent member whereby said wiper member may be held stationary while said moving member moves, said detent being normally out of the path of movement of said wiper part, and means for moving said detent to said part-engaging position.

11. In a windshield cleaner, a fluid pressure operated cylinder mounted to reciprocate adjacent a vehicle windshield and embodying a wiper-supporting part, a wiper slidably supported from said cylinder part so as to be movable toward or from one end of said cylinder, a spring coiled about said part and connected to said wiper for releasably connecting said wiper to said cylinder whereby said wiper may move with said cylinder and wipe the windshield glass, a detent member arranged adjacent the windshield glass and having a part adapted to engage a part of said wiper to hold said wiper from movement with said cylinder whereby said wiper remains stationary while said cylinder moves, and a single means for successively and selectively placing in operation said cylinder and said detent member whereby the wiper will be in operation prior to the actuation of said detent member.

12. In a windshield cleaner, a fluid pressure operated cylinder mounted to reciprocate adjacent a vehicle windshield, a wiper supporting member carried by said cylinder, a wiper carriage slidably mounted on said supporting member, a wiper carried by said wiper carriage, said wiper carriage being frictionally connected to said supporting member so as to normally move with said supporting member and said cylinder to wipe the windshield glass, a control member having a part adapted to hold said carriage from moving engagement with said supporting member and hold said wiper carriage and wiper stationary while said cylinder and supporting member reciprocate, and means for operating said control member.

13. In a windshield cleaner, a housing having a slot lengthwise thereof, a fluid pressure operated cylinder therein mounted to reciprocate adjacent a vehicle windshield, a wiper supporting member carried by said cylinder, a wiper carriage slidably mounted on said supporting member and operating in the housing slot, a wiper carried by said wiper carriage, means connecting said wiper carriage to said supporting member so as to move with said supporting member and said cylinder to wipe the windshield glass, a wiper arresting device carried exteriorly on the housing adjacent the slot and having a part movable to engage a part on said wiper carriage to render said means inoperative and hold said wiper carriage and wiper stationary while said cylinder and supporting member reciprocate, and means for operating said control member.

14. In a windshield cleaner, a fluid pressure operated movable member, a wiper operably connected to the movable member to be normally moved thereby on the windshield glass, a fluid pressure operated control member having a part projectable into the path of said wiper to maintain the wiper stationary while permitting the movable member to move, a control valve having a port in communication with said fluid pressure operated movable member, a port communicating with the fluid pressure operated control member, and a port communicating with a source of reduced pressures, and a single valve element operable to selectively connect the last port to the aforesaid valve ports.

15. In a windshield cleaner, a wiper operating member slidable back and forth across the glass of a windshield, a wiper member movable with said operating member for cleaning a portion of the windshield glass substantially coextensive with the movement of said operating member, and means adjustably connecting the wiper member to the operating member whereby said wiper member may be positioned relative to said operating member for cleaning a different portion of the windshield glass for a distance substantially coextensive with the movement of said operating member.

16. In a windshield cleaner, a wiper operating member comprising an elongated support slidably mounted for lengthwise movement across the glass of a windshield, means for longitudinally reciprocating said support across the windshield glass, a wiper member slidably mounted on the support for selective positioning thereon and normally movable with the support in any set position, and a manually controlled arresting device adjacent the path of travel of the wiper member operable to engage said wiper member for arresting the same whereby said support may move independently thereof a predetermined distance before said arresting means is manually rendered inoperative so that thereby said wiper is adjusted to a new position on said support for cleaning a different area of the windshield glass.

17. In a windshield cleaner, a wiper operating member comprising an elongated support, means for mounting said member and support for sliding movement lengthwise of said support and across the glass of a windshield, means for imparting a reciprocatory movement to said support from a point adjacent one side edge of the windshield to a point adjacent the opposite side edge thereof, the extent of movement of said support being less than the length thereof whereby a portion of the length of said support when at one limit of its movement will overlap in part the position of said support when at its opposite limit of movement, said overlapping zone occurring in proximity to the center of the windshield, a wiper member mounted on said support for movement therewith and adjustment therealong, and an arresting device mouned upon a stationary part to engage said wiper member within said overlapping zone to hold it therein while the support moves independently thereof.

18. In a windshield cleaner, a motor, an elongated support adapted to be mounted adjacent the windshield glass, said support being reciprocated lengthwise across the windshield glass by said motor, a pair of wiper members carried by said support and movable therewith for operating on the windshield glass to clean the same, one of said wiper members being adjustable along said support toward and from said other wiper member, and means arranged alongside the path of travel of said support and having a part movable into the path of movement of said adjustable wiper member for engaging and arresting the same against movement with said support.

19. In a windshield cleaner, a wiper moving member, a plurality of spaced wiper members, one of which is adjustably connected to said wiper moving member for adjustment laterally toward and from the companion wiper, means to actuate said wiper moving member to thereby move said wiper members back and forth on the windshield, and means stationarily mounted alongside the path of travel of said adjustably connected wiper member for temporarily arresting the same and thereby effect adjustment thereof with respect to the first wiper member by and during movement of said wiper moving member and a variation in the spacing of said wiper members.

20. In a windshield cleaner, a windshield cleaning element adapted to contact with a portion of the windshield glass to clean the same, an operating member for said windshield cleaner element, a connection between said windshield cleaning element and said operating member, said connection including a carriage slidably and frictionally mounted on said operating member a distance from the point where said cleaner element contacts with the glass, whereby forces tending to resist the movement of said cleaner element on the glass will tend to cant the carriage on the operating member and thereby increase the frictional connection therebetween to prevent said connection from sliding on the operating member, and whereby forces applied to the connection with the operating member may move said connection and said cleaner element relatively to said operating member, and means mounted alongside of the path of travel of said connection for engaging the same to effect relative movement between said connection and said operating member.

21. In a windshield cleaner, a support, a pair of cleaner elements adjustable relative to each other and carried by said support, one of said cleaner elements cleaning a portion of the windshield glass at the left side thereof and the other cleaner element cleaning a portion of the same face of the windshield glass at the right side thereof, means for reciprocating said support to effect reciprocation of both of said cleaner elements back and forth on the same face of the windshield glass, and means operating to effect movement of one of said cleaner elements on and relative to said support for varying the spaced relation of said cleaner elements.

22. In a windshield cleaner, a fluid pressure operated wiper moving member, a wiper member slidably supported on said wiper moving member, means for normally connecting said wiper member to said moving member so that said wiper member and said moving member move together, a fluid pressure projected detent member adjacent said wiper and embodying a part adapted to be hooked into engagement with said wiper member whereby the latter may be held stationary while said moving member moves, and means for successively supplying operating fluid pressure to said wiper moving member and said detent to operate the same.

HENRY HUEBER.